June 26, 1962 M. E. LINDSAY 3,040,506
CRANK AND CAM-TRACK DRIVE FOR OSCILLATING
BARS OF COTTON PICKERS
Filed Aug. 24, 1959
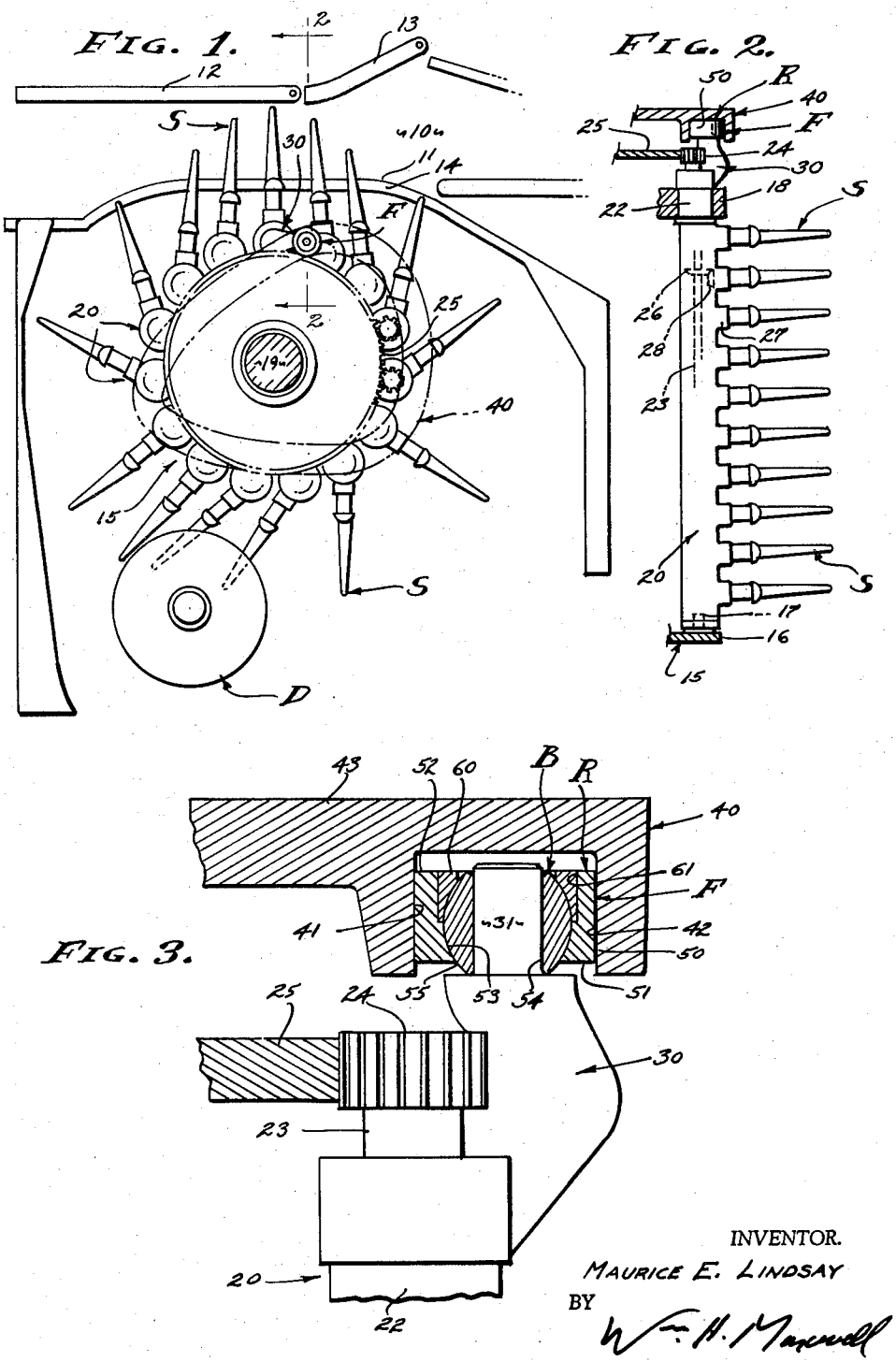
INVENTOR.
MAURICE E. LINDSAY
BY
AGENT

United States Patent Office 3,040,506
Patented June 26, 1962

3,040,506
CRANK AND CAM-TRACK DRIVE FOR OSCIL-
LATING BARS OF COTTON PICKERS
Maurice E. Lindsay, Bakersfield, Calif., assignor, by
mesne assignments, to Spindle Specialty Co., Bakers-
field, Calif., a corporation of California
Filed Aug. 24, 1959, Ser. No. 835,732
3 Claims. (Cl. 56—43)

This invention relates to a cotton picking machine and is particularly concerned with the picking drum and pick- ing bars thereof and relates to the cam-track and roller that operate to position the picking bars as the drum ro- tates and in order to articulate the spindles carried by the bars, all to the end that the spindles project into and retract from the picking zone of the machine.

A general object of this invention is to provide a cot- ton picker drum and cam that involves self aligning fea- tures, to the end that damage or complete breakdown, cannot be caused by minor misalignments or bending and deflection of parts.

Cotton picking machines employ picking units, each composed of various elements including the spindles that function to pick the cotton fibers.

A typical machine has several picking heads being ar- ranged at opposite sides of a picking zone that accommo- dates a row of plants to be picked. Each picking head, in the particular machine under consideration, involves a drum arrangement wherein articulated picking bars are carried by the drum. The picking bars carry the pick- ing spindles, and as the machine advances through a crop the drum revolves synchronously with the speed of travel and the bars are oscillated relative to the drum so that they are projected into and retracted from the picking zone at an angle normal to the forward motion of the machine.

In order to provide the oscillating motion of the pick- ing bars relative to the rotating drum, the machine is commonly provided with a crank that has a follower operating in a cam-track. The usual cam and cam-track type of drive is generally satisfactory, but is very suscepti- ble to damage and even at its best is far from efficient in its operation. For example, the slightest misalignment of parts results in noise, inefficiency and excessive wear, the slightest deformation of parts whether temporary or permanent results in excessive and damaging strains, and deformation or bending of parts to any substantial degree results in damage and breakage of parts.

In actual practice, an ordinary cotton picking machine is very often damaged by sticks or extra heavy branches or trunks, or any other substantial sized debris, that catch the spindles as they are oscillated relative to the ro- tating drum. Since the usual crank and cam-track do not allow for flexibility in the parts involved, bending or deflection of the crank relative to the cam-track results in breakage, usually breakage of the cam-track. It will be apparent that when the cam-track is damaged, the necessary oscillating function that articulates the spindle carrying picking bars is lost, all to the end that effective- ness of the entire machine is destroyed.

An object of this invention is to provide a crank and cam-track, in a cotton picking machine of the character described, with a follower that operates efficiently and which eliminates breakage of the machine parts when said parts are deflected under abnormal conditions, and which eliminates breakage of said parts even when they are permanently deformed. As a result, inaccuracy whether a result of original manufacture or as a result of deformation during field operation do not adversely affect normal operation of the machine.

It is another object of this invention to provide a crank and cam-track follower for a cotton picking machine of the character referred to that can be made of full width in order to have a maximum bearing surface such as to re- duce wear in both the follower and cam-track. In ordi- nary structures of the type under consideration the fol- lower is a rigidly mounted roller that must be made con- siderably narrower than the track in order to be able to be angularly deflected when the crank is bent, either temporarily or permanently bent.

It is still another object of this invention to provide fol- lowers to operate between cranks and a cam-track and in a cotton picking machine of the character referred to, that function smoothly by aligning the parts involved in spite of inaccuracies that are inherently present as a result of manufacture and of normal use and also as a result of abnormal abuse. By providing a follower that is self- aligning, the operating efficiency of the structure is greatly increased with quieter operation and increased wearing qualities.

It is also an object of this invention to provide a rela- tively inexpensive yet highly improved follower, said fol- lower to be used in place of existing followers, without changing the existing crank and cam-track and all to the end that maximum efficiency and reliability is realized ac- companied by elimination of breakage and inoperative- ness ordinarily due to abnormal flexations in the parts that are involved.

The various objects and features of my invention will be fully understood from the following detailed descrip- tion of the typical preferred form and application of the invention, throughout which description reference is made to the accompanying drawings, in which:

FIG. 1 is a plan view taken at the picking head of a typical cotton picking machine of the type under con- sideration, said view being diagrammatic in order to show the various essential elements involved. FIG. 2 is a view taken substantially as indicated by line 2—2 on FIG. 1 and illustrates one of the picking bars with its related crank and follower operatively engaged with the cam-track of the machine. FIG. 3 is an enlarged detailed view of the crank and follower engaged in the cam-track, with a portion of the crank broken away to show the spindle drive gearing.

In FIG. 1 of the drawings I have illustrated the fea- tures of a cotton picking machine that are essential to the drum and cam-track roller that I provide. It is to be understood that the structure shown is supported by a suitable vehicle, such as a tractor or the like, and car- ried through or over the cotton crop to be harvested. I have indicated a picking zone 10 defined by a slotted wall 11 on one side and compressor sheets 12 and 13 on the other side. The picking zone 10 is in the nature of a tunnel or passage open at the front and back and so that a row of plants will readily pass therethrough. The wall 11 and compressor sheets 12 and 13 are verti- cally disposed and related to act to condense the plant foliage so that it can be reached by the spindle S, said spindles being projected into the picking zone 10 through the slots 14 in the wall 11. Since the spindles move longitudinally as they are advanced into and retracted from the picking zone 10, the slots 14 are longitudi- nally disposed, there being a slot for each spindle that enters into said zone.

A cotton picking machine of the type under consid- eration involves a drum 15 that revolves synchronously with the forward motion of the tractor that carries the picking structure. In practice, the drum 15 is of sub- stantial diameter and is equipped with an equally spaced series of picking bars 20. The axis of the drum 15 is vertically disposed with the periphery of the drum at or near the outside of the wall 11. The axes of the pick- ing bars 20 are parallel with each other and with the axis of the drum and each bar is swivelly carried by the drum so that it can be independently oscillated relative thereto. As best illustrated in FIG. 2 the lower end 16 of the drum is provided with a pivot bearing 17 to rotatably support the lower terminal end portion 21 of the picking bar, while the upper end of the drum is provided with a journal bearing 18 to rotatably support the upper end portion 22 of the picking bar.

In practice, there will be approximately fifteen picking bars 20, each independently pivoted on its vertical axis, and the drum 15 is carried by a shaft 19 supported in suitable journals (not shown) so that it is rotatable to be powered and driven at a peripheral speed substantially equal to the forward linear motion of the picking machine. Further, a drive gear 25 is carried by the machine independently of the drum 15 and concentric with the axis of the drum. The gear 25 is preferably located at or above the top of the drum 15 and is rotated and it has a toothed periphery somewhat inward of the axes of the bars 20.

The gear 25 is employed to drive the spindles S through gearing incorporated in the bars. As indicated, each bar is tubular and is provided with a drive shaft 23 suitably journaled therein. The shaft 23 projects from the upper end of the bar 20 where it has a driven gear 24 that meshes with the drive gear 25, to the end that the shaft 23 operates as the drum 15 and bars 20 revolve relative to said drive gear. Further, the shaft 23 has a driving gear 26 for each of the spindles S, and in practice there will be ten or fifteen spindles along each picking bar 20. As shown, the spindles S are individually journaled along the bar 20, said spindles projecting radially from the bar in a common direction. Since the spindles are elongate cone-shaped elements they are rotated on slightly inclined axes so that the upper peripheries thereof extend horizontally, in which case the bearings 27 in the side of the bar 20 are correspondingly inclined. In order that the spindles S be rotated, they have bearing portions rotatably engaged in the bearings 27 and driven gears 28 that angularly mesh with the driving gears 26. It will be apparent that the spindles S will be driven to rotate as the drum 15 revolves and that the said rotating spindles are projected through the slots 14 and into and out of the picking zone 10.

In order to project the spindles S into and to retract them from the picking zone 10, it is necessary that the axes of the spindles S be normal, or substantially so, to the direction of travel of the over-all machine. Therefore, means is provided to oscillate the bars individually so that they each turn upon their vertical pivotal axis. In accordance with common practice, there is a crank 30 that projects laterally from the upper end of the picking bar 20 and there is a cam-track 40 that overlies the drum 15 and bars 20. The crank 30 projects laterally and radially of the axis of the bar and swings circumferentially behind the said bar (see FIG. 1) as the bar is advanced by rotation of the drum 15. The cam-track 40 is a downwardly opening channel-shaped element with inner and outer walls 41 and 42 that are vertically disposed and equi-distant from each other as they extend 360° around the drum. The cam-track 40 is supported and carried in a fixed position by the machine construction and there is a follower F that is provided in accordance with the invention to translate the cam shape into oscillatory motion of the bars 20.

The cam-track 40 is shaped as circumstances require to oscillate the cranks 30 and bars 20, so that the spindles S are normally related to the picking zone 10 and so that the spindles S are also maintained in substantial parallelism as they are passed by the doffer D (see FIG. 1). In any case, the cam-track 40 is irregularly shaped with the walls 41 and 42 depending from a plate-like supporting element 43.

The crank 30 is an arm-shaped element that projects laterally of the axis of the bar 20 and is characterized by a vertically disposed pin 31 at the outer terminal end thereof. The pin 31 extends upwardly from the crank 30 to lie between the two walls of the cam-track 40, to be guided by said walls. Ordinarily, the said pin 31 is employed to journal a follower in the form of a roller on a fixed vertically disposed axis, said roller being of a diameter to extend between the walls 41 and 42 to tangentially engage said walls at diametrically opposite sides of the roller. However, the said pin 31, in accordance with the present invention, is employed to journal a follower F that is self-aligning and not rigidly vertically disposed.

The self-aligning follower F that I have provided in the crank and cam-track drive for oscillating a picking bar in a cotton picking machine is supported on the pin 31 at the terminal end of the crank 30 and operates between the walls 41 and 42 of the cam-track 40. As best illustrated in FIG. 3 of the drawings, the follower F involves, generally, a roller R carried on a bearing B. The roller R is a wheel-shaped part with a cylindrical periphery 50 that is smooth and preferably hardened. The roller R has a flat bottom 51 and a flat top 52 parallel with the bottom and with a bore 53 that is concentric with the periphery 50 and which extends therethrough to open at said bottom and top.

The bearing B is adapted to universally and rotatably carry the roller R and has a central bore 54 to receive the pin 31 and it is characterized by a convexly-shaped spherical outer wall 55. The spherical wall 55 is formed concentrically with the axis of the bore 54 so that the center of the spherical wall occurs at or along the center axis of the pin 31. The wall 55 is smooth so as to act as a bearing that is adapted to slidably and rotatably engage a part to be supported and the bore 53 is a concave-shaped spherical bore formed to slidably engage with the outer wall 55 of the bearing B. To provide for assembly of the follower F the body of the roller R is sectional with a retainer section 60 that is pressed into a counter bore 61 in the upper end of the roller, said retainer forming a continuation of the concaved and spherically shaped bearing surface of the bore 53.

In carrying out the present invention the bearing B is engaged on the pin 31 and is secured in working position as by a press fit or as by threadedly engaging it on the pin. The diametrically opposite peripheral portions of the roller R are coextensive with the height of the walls 41 and 42 and engage with the walls and it clears the plate 43. As the drum 15 and picking bars 20 move relative to the cam-track 40, the cranks 30 are turned in order to oscillate the said bars and spindles S operatively carried thereby. As the follower F is pulled through or along the cam-track 40 any variations or imperfections in alignment are compensated for by the bearing B that universally and rotatably carries the roller R on the pin 31. Further, in the event that strains are imposed upon the picking machine so as to affect alignment of the followers F with the cam-track 40, the bearings B allow for the resultant variations or deformations that occur. In actual practice, substantial stresses and strains far beyond the normal capacity of the machine can be successfully encountered without damage and without breakage of parts and all without ill effects upon the operation of the structure.

From the foregoing it will be apparent that I have provided a very simple and practical crank and cam-track drive for the picking bars of cotton picking machines and which eliminates the problems that accompany the usual misalignment of parts. As a result, the cotton picking machine becomes more reliable and not subject to breakdown, and it operates much smoother and quieter and with increased efficiency.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. In a cotton picking machine, a drum that revolves with motion of the machine, picking bars pivotally carried at the periphery of the drum, cranks projecting laterally from the said bars, a cam-track surrounding the axis of the drum and having spaced walls defining a follower guiding channel, and a follower at each bar and engaged in the cam-track to translate the shape of the said channel into oscillations of the said crank and said bar and comprising a self-aligning roller rotatably carried by the crank and engaging with the cam-track, said roller being rotatably carried on a spherically shaped bearing to be angularly shiftable.

2. In a cotton picking machine, a drum that revolves with motion of the machine, picking bars pivotally carried at the periphery of the drum, cranks projecting laterally from the said bars and each with a pin on an axis of the bar, a cam-track surrounding the axis of the drum and having spaced walls defining a follower guiding channel, and a follower at the pin of each bar and engaged in the cam-track to translate the shape of the said channel into oscillations of the said crank and said bar and comprising a self-aligning roller unit carried by and pressed onto said pin and engaging with the cam-track.

3. In a cotton picking machine, a drum that revolves with motion of the machine, picking bars pivotally carried at the periphery of the drum, cranks projecting laterally from the said bars and each with a pin on an axis offset from and substantially parallel with the axis of the bar, the drum by means of cranks shifted by a cam-track, surrounding the axis of the drum and having spaced walls defining a follower guiding channel, and a follower at the pin of each bar and engaged in the cam-track to translate the shape of the said channel into oscillations of the said crank and said bar and comprising a self-aligning roller unit carried on the said pin and engaging with the cam-track, said roller unit having a spherically shaped bearing pressed onto the said pin to be angularly shiftable and rotatably carrying a roller.

References Cited in the file of this patent

UNITED STATES PATENTS

| | | |
|---|---|---|
| 788,812 | Appleby | May 2, 1905 |
| 1,658,318 | Wineman | Feb. 7, 1928 |
| 1,737,850 | Johnston et al. | Dec. 3, 1929 |
| 2,140,631 | Johnston | Dec. 20, 1938 |
| 2,735,313 | Dickson | Feb. 21, 1956 |
| 2,816,457 | Steryer | Dec. 17, 1957 |
| 2,908,186 | Meyer | Oct. 13, 1959 |